(12) United States Patent
Kuwahara et al.

(10) Patent No.: US 10,808,775 B2
(45) Date of Patent: Oct. 20, 2020

(54) TORQUE LIMITER

(71) Applicant: AISIN SEIKI KABUSHIKI KAISHA, Kariya-shi, Aichi-ken (JP)

(72) Inventors: Kuniaki Kuwahara, Aichi-ken (JP); Kozo Nakagawa, Aichi-ken (JP); Yutaro Tanaka, Aichi-ken (JP)

(73) Assignee: AISIN SEIKI KABUSHIKI KAISHA, Kariya-Shi, Aichi-Ken (JP)

( * ) Notice: Subject to any disclaimer, the term of this patent is extended or adjusted under 35 U.S.C. 154(b) by 298 days.

(21) Appl. No.: 15/923,202

(22) Filed: Mar. 16, 2018

(65) Prior Publication Data

US 2018/0283474 A1 Oct. 4, 2018

(30) Foreign Application Priority Data

Mar. 29, 2017 (JP) ................................ 2017-064630

(51) Int. Cl.
*F16D 43/202* (2006.01)
*F16D 7/04* (2006.01)

(52) U.S. Cl.
CPC .......... *F16D 43/2024* (2013.01); *F16D 7/044* (2013.01); *F16D 43/202* (2013.01)

(58) Field of Classification Search
CPC ..... F16D 43/2024; F16D 43/202; F16D 7/044
USPC ......................................... 464/38; 192/56.61
See application file for complete search history.

(56) References Cited

U.S. PATENT DOCUMENTS

| | | | | |
|---|---|---|---|---|
| 4,373,924 A | * | 2/1983 | Schuhmacher | F16D 7/044 192/56.61 |
| 4,928,802 A | * | 5/1990 | Weiss | F16F 1/32 464/38 |
| 5,819,888 A | | 10/1998 | Tamura et al. | |

FOREIGN PATENT DOCUMENTS

| | | | |
|---|---|---|---|
| FR | 1.249.710 | * 11/1960 | ...................... 464/38 |
| JP | H09-126257 A | 5/1997 | |
| JP | 2014-052048 A | 3/2014 | |
| WO | 2008017433 A1 | 2/2008 | |

OTHER PUBLICATIONS

Chinese Office Action dated May 27, 2020, in corresponding Chinese Application No. 201810258655 and Partial English translation, 9 pages.

\* cited by examiner

*Primary Examiner* — Greg Binda
(74) *Attorney, Agent, or Firm* — Buchanan Ingersoll & Rooney PC

(57) ABSTRACT

A torque limiter includes a first meshing portion provided at a surface of an input shaft, a plate including a second meshing portion which is configured to mesh with the first meshing portion, and a disc spring portion integrally rotatable with an output shaft. The disc spring portion includes an engaging portion engaging with the plate. The disc spring portion is deflected to displace the engaging portion in a direction opposite to the plate in a case where a load equal to or greater than a set value is applied to the disc spring portion while pressing the plate via the engaging portion so as to bias the second meshing portion towards the first meshing portion.

8 Claims, 14 Drawing Sheets

TORQUE LIMITER

CROSS REFERENCE TO RELATED APPLICATIONS

This application is based on and claims priority under 35 U.S.C. § 119 to Japanese Patent Application 2017-064630, filed on Mar. 29, 2017, the entire content of which is incorporated herein by reference.

TECHNICAL FIELD

This disclosure generally relates to a torque limiter.

BACKGROUND DISCUSSION

A known torque limiter which is incorporated in a differential gear is disclosed in JP2014-052048A (hereinafter referred to as Patent reference 1). The torque limiter disclosed in Patent reference 1 includes a first rotational member, a second rotational member, and a pressing mechanism which are arranged in a differential case rotatably provided about an axis of a drive shaft. The first rotational member integrally rotates with the differential case by an output of a transmission. The second rotational member faces and is coaxially arranged with the first rotational member so as to be engageable therewith. The pressing mechanism is disposed adjacent to the first rotational member and generates a pressing force in a circumferential direction of the pressing mechanism by a spring.

The first rotational member includes teeth extending in a radial direction of the first rotational member at a surface facing the second rotational member. The second rotational member includes teeth extending in a radial direction of the second rotational member at a surface facing the first rotational member. The first rotational member and the second rotational member engage with each other via the teeth thereof.

The first rotational member which is provided so as to be slidable in an axial direction of the first rotational member and the pressing mechanism which is provided so as to be slidable in the circumferential direction of the pressing mechanism are arranged such that inclination surfaces thereof engage with each other. Accordingly, the first rotational member is applied with the pressing force in the circumferential direction as a pressing force in the axial direction via the inclination surface, and thereby slides and is pressed towards the second rotational member.

In the aforementioned configuration, in a state where a torque which is equal to or lower than a maximum torque is inputted to the differential gear, the first rotational member and the second rotational member transmit such torque by maintaining the engagement therewith with the pressing force applied by the pressing mechanism. Meanwhile, in a case where the differential gear is inputted with a torque that is equal to or greater than a predetermined value, the first rotational member and the second rotational member disconnect the transmission of the torque by the disengagement of the first rotational member and the second rotational member by sliding of the first rotational member in a direction opposite to the second rotational member against the pressing force applied by the pressing mechanism.

However, because the torque limiter disclosed in Patent reference 1 uses a sliding member as a requisite component to establish an operation disconnecting the transmission of the torque (disconnecting operation), issues described below occur.

First, even though the torque limiter is designed to disconnect the transmission of the torque when the predetermined torque is inputted, in a case where the predetermined torque is actually inputted, the transmission of the torque may not be disconnected because the sliding member applied with a large amount of load slides against a frictional force. Specifically, when the aforementioned predetermined torque is inputted, it is intended that the first rotational member slides in a direction away from the second rotational member against the pressing force applied from the pressing mechanism. However, because the frictional force is generated at a part where the inclination surface of the first rotational member and the inclination surface of the pressing mechanism are in contact with each other, and at a part between the pressing mechanism and a guide wall surrounding the pressing mechanism, for example, the first rotational member may not slide as intended and the transmission of the torque may not be disconnected even though the aforementioned predetermined torque is inputted. Accordingly, in practice, the transmission of the torque may not be disconnected even when the torque which is larger than the aforementioned predetermined torque is inputted. Thus, a torque (a release torque) required by the torque limiter to establish the disconnecting operation may increase depending on the frictional force arising from the sliding member.

Moreover, in a case where a high-frequency impact load is inputted, the sliding member may move (slide) at a timing later than intended because of having a large inertia mass. Accordingly, in practice, the transmission of the torque may not be disconnected even when the torque larger than the predetermined torque is inputted. Thus, the release torque may increase depending on the inertia mass of the sliding member.

As above, when the torque limiter is designed, it is required to include a power transmission system, for example, the torque limiter, having a great torque strength by assuming that the release torque may increase. Thus, the power transmission system is required to be upsized.

A need thus exists for a torque limiter which is not susceptible to the drawback mentioned above.

SUMMARY

According to an aspect of this disclosure, a torque limiter includes a first meshing portion being provided at a surface of an input shaft which transmits a drive force of a drive motor, the surface intersecting with an axial direction of the input shaft, a plate being formed in an annular shape, being provided coaxially with the input shaft, and including a second meshing portion which faces the first meshing portion in the axial direction and which is configured to mesh with the first meshing portion, and a disc spring portion being integrally rotatable with an output shaft which is provided coaxially with the input shaft and which is rotatable relative to the input shaft, the disc spring portion including an engaging portion engaging with the plate, the disc spring portion being deflected to displace the engaging portion in a direction opposite to the plate in a case where a load equal to or greater than a set value is applied to the disc spring portion while pressing the plate via the engaging portion so as to bias the second meshing portion towards the first meshing portion.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
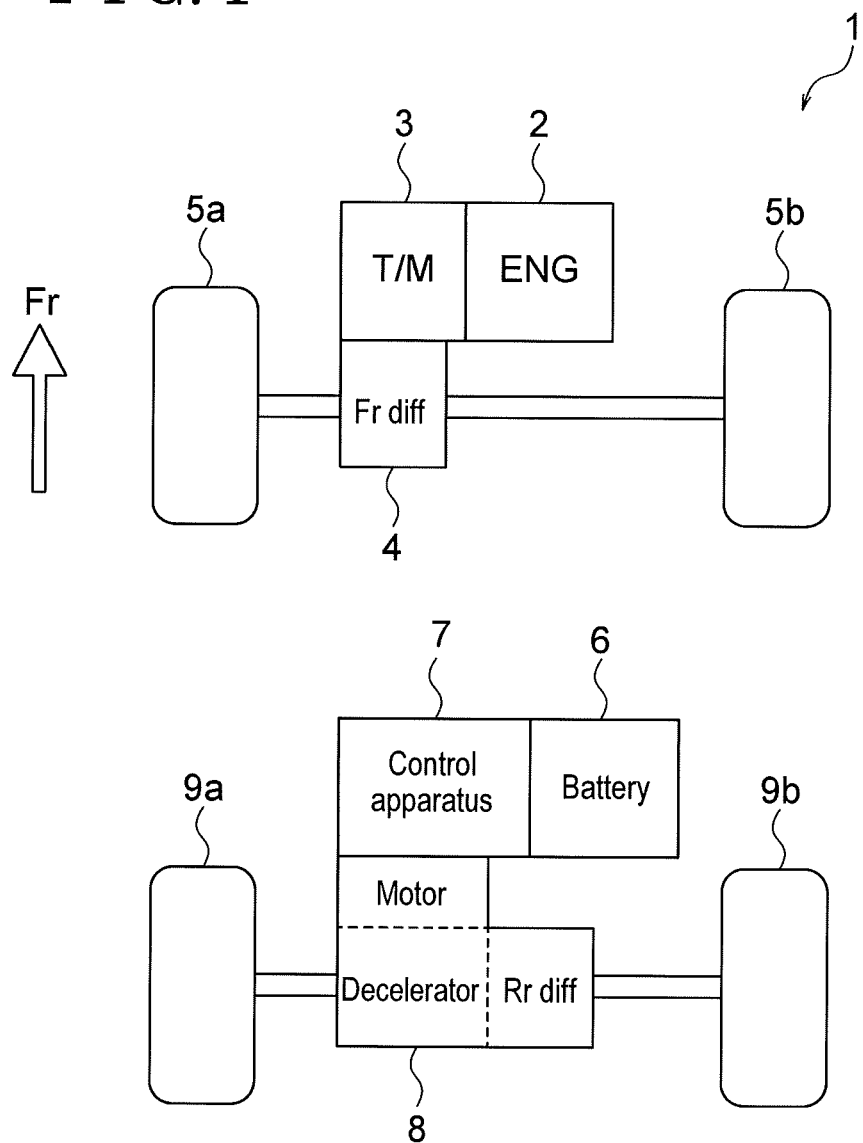
FIG. 1 is a block diagram illustrating a basic configuration of a power train on which a torque limiter according to a first embodiment of the disclosure is assembled.

Embodiments in this disclosure are explained with reference to the attached drawings. In the drawings, the same or similar components bear the same reference numerals. In addition, some of the components illustrated in one or more of the drawings may be omitted in the other of the drawings, for example, for the purpose of explanation. Further, a reduction scale may not be accurate in the drawings.

A torque limiter in this disclosure is mounted, for example, at a vehicle which employs a part-time four-wheel-drive system where the vehicle is driven in a front-wheel-drive mode under a usual condition and is driven in a four-wheel-drive mode under an optional condition. The torque limiter in this disclosure is also applicable to a vehicle which employs any drive system including a front-wheel-drive system (i.e., a front-engine, front-wheel-drive layout (FF) vehicle), a rear-wheel-drive system (i.e., a front-engine, rear-wheel-drive layout (FR) vehicle, a mid-engine, rear-wheel-drive layout (MR) vehicle, and a rear-engine, rear-wheel-drive layout (RR) vehicle), and a full-time/part-time four-wheel-drive system, for example.

A construction of a powertrain where the torque limiter is mounted is explained with reference to FIG. 1.

As illustrated in FIG. 1, a vehicle 1 mainly includes, as a front-wheel powertrain, an engine (ENG) 2 generating a drive force, a transmission (T/M) 3 transmitting the drive force of the engine 2, and a front-wheel differential gear (Fr differential) 4 configured to transmit the drive force that is transmitted from the transmission 3 to a left-front wheel 5a and a right-front wheel 5b. The front-wheel differential gear 4 operates to equalize a rotation speed (the number of rotations) of the left-front wheel 5a and a rotation speed (the number of rotations) of the right-front wheel 5b in a case where the vehicle 1 is driven forward and to adjust the rotation speed of the left-front wheel 5a and the rotation speed of the right-front wheel 5b to appropriate numbers respectively in a case where the vehicle 1 turns right or left.

In addition, the vehicle 1 mainly includes, as a rear-wheel powertrain, a battery 6 supplying an electric power, a control apparatus 7 controlling a motor unit 8 with the electric power supplied from the battery 6, and the motor unit 8 controlled by the control apparatus 7 to rotate a left-rear wheel 9a and a right-rear wheel 9b. The motor unit 8 includes a motor generating a drive force, a decelerator transmitting the drive force of the motor and a rear-wheel differential gear (Rr differential) configured to transmit the drive force that is transmitted from the decelerator to the left-rear wheel 9a and the right-rear wheel 9b. The rear-wheel differential gear operates to equalize a rotation speed (the number of rotations) of the left-rear wheel 9a and a rotation speed (the number of rotations) of the right-rear wheel 9b in a case where the vehicle 1 is driven forward and to adjust the rotation speed of the left-rear wheel 9a and the rotation speed of the right-rear wheel 9b to appropriate numbers respectively in a case where the vehicle turns right or left.

The vehicle 1 including the aforementioned powertrain is operated in the front-wheel-drive mode under the usual condition so that the drive force is transmitted to the left-front wheel 5a and the right-front wheel 5b simply by the front-wheel powertrain. In addition, the vehicle 1 is operated in the four-wheel-drive mode under the optional condition, i.e., when the vehicle is driven on a snowy road, for example, so that the drive force is transmitted not only to the left-front wheel 5a and the right-front wheel 5b but also to the left-rear wheel 9a and the right-rear wheel 9b by an operation of a driver of the vehicle or the control of the control apparatus 7.

The motor unit 8 incorporates therein the torque limiter according to one embodiment as explained below.

Figure 2:
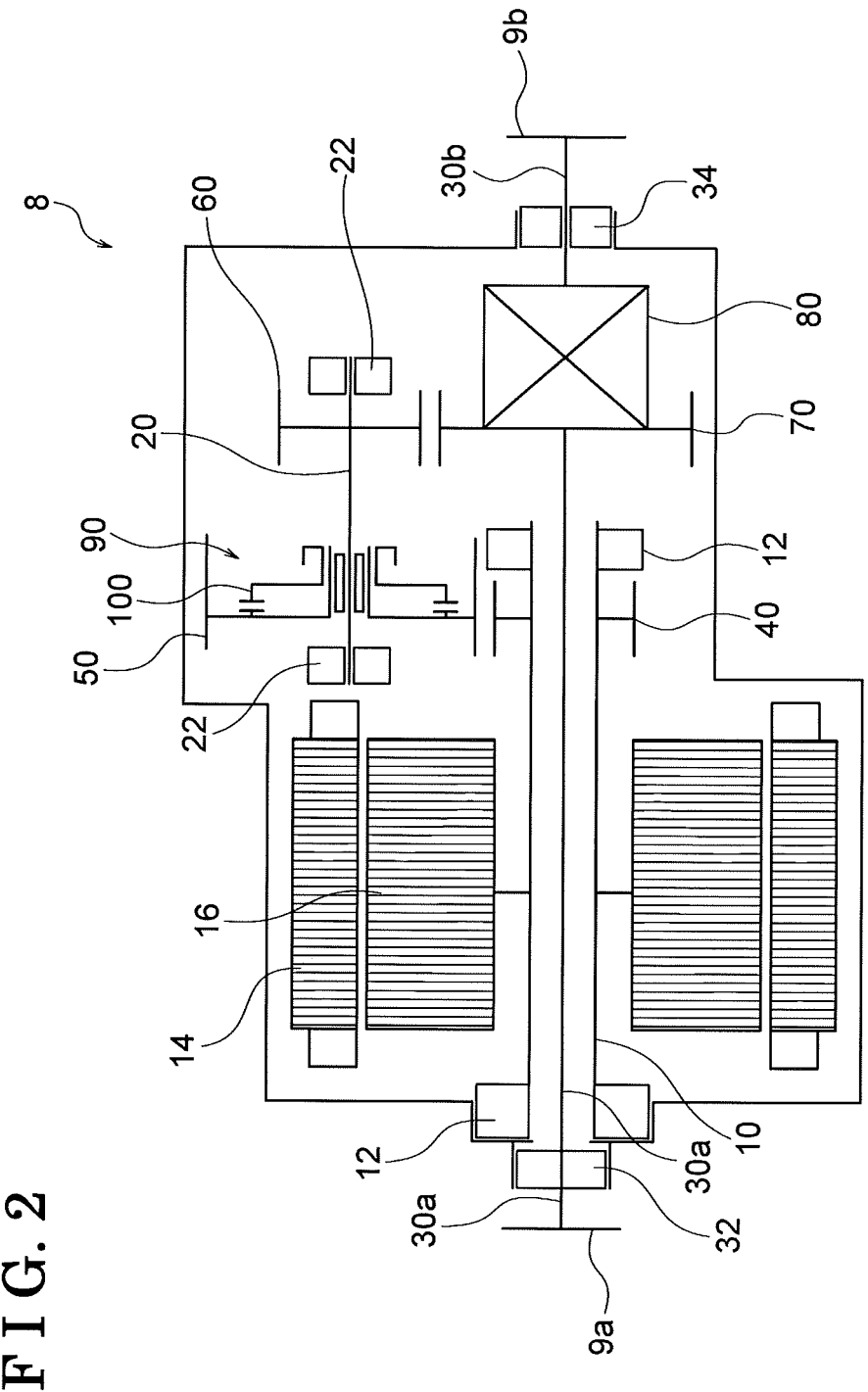
FIG. 2 is a schematic view illustrating a configuration of a motor unit (a motor unit 8 on which the torque limiter of the first embodiment is mounted) shown in FIG. 1.

A basic construction of the motor unit 8 where the torque limiter is mounted is explained with reference to FIG. 2.

The motor unit 8 includes, as main shafts, a motor drive shaft 10 in a hollow form, a counter shaft 20 (i.e., serving as an output shaft), a left-rear wheel drive shaft 30a and a right-rear wheel drive shaft 30b. The motor drive shaft 10 is rotatably supported by a bearing 12. A rotor 16 provided facing a stator 14 is mounted at an outer circumference of the motor drive shaft 10. The counter shaft 20 is arranged in parallel to the motor drive shaft 10 and is rotatably supported by a bearing 22. The left-rear wheel drive shaft 30a penetrates through the motor drive shaft 10 to be positioned within the motor drive shaft 10 and to be arranged coaxially with the motor drive shaft 10. The left-rear wheel drive shaft 30a to which the left-rear wheel 9a is fixed is rotatably supported by a bearing 32. The right-rear wheel drive shaft 30b is arranged coaxially with the left-rear wheel drive shaft 30a. The right-rear wheel drive shaft 30b to which the right-rear wheel 9b is fixed is rotatably supported by a bearing 34. It may be considered that the stator 14, the rotor 16 and the motor drive shaft 10, for example, mainly constitute the motor.

The motor unit 8 includes, as main gears, a counter drive gear 40, a counter driven gear 50 (i.e., serving as an input shaft), a final drive gear 60, a final driven gear 70, and a rear-wheel differential gear (Rr differential) 80. The counter drive gear 40 is arranged at the motor drive shaft 10 to integrally rotate therewith. The counter driven gear 50 is arranged at the counter shaft 20 and is rotatable relative to the counter shaft 20 in a state engaging with the counter drive gear 40. The final drive gear 60 is arranged at the counter shaft 20 to integrally rotate therewith. The final driven gear 70 is arranged at the left-rear wheel drive shaft 30a in a state engaging with the final drive gear 60. The rear-wheel differential gear 80 is arranged between the left-rear wheel drive shaft 30a and the right-rear wheel drive shaft 30b. It may be considered that the counter driven gear 50, the counter shaft 20, the final drive gear 60 and the final driven gear 70, for example, mainly constitute the decelerator.

The motor unit 8 further includes a torque limiter 90 engageable with both the counter driven gear 50 and the counter shaft 20 to control torque transmission therebetween.

The torque limiter 90 includes a first face cam 52 (i.e., serving as a first meshing portion) (see FIG. 3), an annular plate 200 (see FIG. 3), and a disc spring unit 100. The first face cam 52 is provided at the counter driven gear 50. The annular plate 200 includes a second face cam 210 (i.e., serving as a second meshing portion) (see FIG. 3) that is meshable with the first face cam 52, the annular plate 200 being coaxially provided with the counter driven gear 50. The disc spring unit 100 is integrally rotatable with the counter shaft 20 and includes engaging portions (a protrusion 130, a recessed portion 135) (see FIG. 3) engaging with the plate 200. The disc spring unit 100 presses the plate 200 via the engaging portions (the protrusion 130, the recessed portion 135) so as to bias the second face cam 210 towards the first face cam 52. The plate spring unit 100 is provided to be deflected or bent so that the engaging portions (the protrusion 130, the recessed portion 135) are displaced in a direction opposite to the plate 200, i.e., in a direction away from the first face cam 52, in a case where a load equal to or greater than a set value is applied to the disc spring unit 100. Accordingly, the torque limiter 90 may fulfill a function as controlling (specifically, allowing and interrupting) the torque transmission between the counter driven gear 50 and the counter shaft 20. The aforementioned function is hereinafter referred to as a "torque connection/disconnection function" for the purpose of explanation.

Specifically, the torque connection/disconnection function is a function for allowing transmission of torque in a case where such torque input to the torque limiter 90 is smaller than a release torque and for prohibiting transmission of torque in a case where such torque input to the torque limiter 90 is equal to or greater than the release torque.

The motor unit 8 including the aforementioned construction is operated as below. In a case where the vehicle 1 is driven in the four-wheel-drive mode, the drive force of the motor (the motor drive shaft 10) is transmitted to the counter shaft 20 via the counter drive gear 40 and the counter driven gear 50. The drive force transmitted to the counter shaft 20 is further transmitted to the final driven gear 70 via the final drive gear 60. The drive force transmitted to the final driven gear 70 is transmitted to the left-rear wheel drive shaft 30a and the right-rear wheel drive shaft 30b via the rear-wheel differential gear 80. The rear-wheel differential gear 80 transmits the drive force to the left-rear wheel drive shaft 30a and the right-rear wheel drive shaft 30b so that the left-rear wheel drive shaft 30a and the right-rear wheel drive shaft 30b rotate at the same rotation speed (same number of rotations) in a case where the vehicle 1 is driven forward. The rear-wheel differential gear 80 also transmits the drive force to the left-rear wheel drive shaft 30a and the right-rear wheel drive shaft 30b so that the left-rear wheel drive shaft 30a and the right-rear wheel drive shaft 30b rotate at respective rotation speeds (respective number of rotations) appropriately in a case where the vehicle 1 turns right or left.

In a case where the torque smaller than the release torque is inputted to the torque limiter 90, the torque limiter 90 operates to allow the torque transmission between the counter driven gear 50 and the counter shaft 20. Specifically, the first face cam 52 and the second face cam 210 mesh with each other by the plate spring unit 100 that presses the plate 200 via the engaging portions 130, 135 so as to bias the second face cam 210 to the first face cam 52 provided at the counter driven gear 50. As a result, the torque limiter 90 allows the torque transmission between the counter driven gear 50 and the counter shaft 20.

On the other hand, in a case where the torque equal to or greater than the release torque is inputted to the torque limiter 90, the torque limiter 90 operates to interrupt or block the torque transmission between the counter driven gear 50 and the counter shaft 20. Specifically, the disc spring unit 100 is deflected or bent so that the engaging portions 130, 135 are displaced in the direction away from the plate 200. The torque limiter 90 thus interrupts the torque transmission between the counter driven gear 50 and the counter shaft 20 by releasing meshing between the first face cam 52 and the second face cam 210.

Next, an example of the specific configuration of the torque limiter 90 and components relating to the torque limiter 90 will hereunder be explained with reference to FIG. 3.

The torque limiter 90 includes the first face cam 52, the annular plate 200, and the plate spring unit 100. The first face cam 52 is provided at the counter driven gear 50 transmitting the drive force of the motor. The annular plate 200 includes the second face cam 210 that is configured to mesh with the first face cam 52, and is coaxially provided with the counter driven gear 50. The plate spring unit 100 is integrally rotatable with the counter shaft 20, and includes protruding portions 130 and recessed portions 135 engaging with the plate 200. The plate spring unit 100 presses the plate 200 via the protruding portions 130 and the recessed portions 135 so as to bias the second face cam 210 towards the first face cam 52. The plate spring unit 100 is provided to be deflected or bent so that the protruding portions 130 and the recessed portions 135 are displaced in the direction opposite to the plate 200 in a case where the load equal to or greater than the set value is applied to the disc spring unit 100.

Further, the torque limiter 90 includes plural protrusions 28 that are arranged at an outer circumferential surface of the counter shaft 20 so as to be spaced apart from one another, and that allow the transmission of the drive force between the counter driven gear 50 and the counter shaft 20 by engaging with the plate spring unit 100.

The example of the specific configuration of the counter driven gear 50 will hereunder be explained with reference to FIG. 3. As illustrated in FIG. 3, the counter driven gear 50 is made of metal, for example, iron, steel, aluminum alloy, or titanium alloy, as a member having an annular shape that, as a whole, includes a through hole 51 along a center axis.

The counter driven gear 50 includes teeth 54 that engage with teeth provided at the counter drive gear 40.

An accommodating space 53, as a whole, extending annularly is provided inside the counter driven gear 50. The accommodating space 53 includes, for example, a first space 53*a* extending annularly, and a second space 53*b* communicating with the first space 53*a* and extending annularly. The first space 53*a* is surrounded by a first outer circumferential wall 53*d* and a first inner circumferential wall 53*a*$_1$, the first outer circumferential wall 53*d* that has a first diameter and that extends annularly, the first inner circumferential wall 53*a*$_1$ that has a second diameter that is smaller than the first diameter and that extends annularly. The second space 53*b* is surrounded by the first outer circumferential wall 53*d* and a second inner circumferential wall 53*b*$_1$ that has a third diameter which is smaller than the second diameter being smaller than the first diameter, and that extends annularly.

A surface 53*e* facing the plate spring unit 100 of the counter driven gear 50, that is, the surface 53*e* that surrounds the first space 53*a* at the counter driven gear 50 and that intersects (here, is orthogonal to) a center axis, is provided with a first face cam 52. The first face cam 52 includes plural teeth (first protrusions) 520 that are arranged so as to be spaced apart from one another and that extend radially. A shape of the tooth 520 will be described later.

The counter shaft 20 is provided inside the through hole 51 of the counter driven gear 50 and the plate spring unit 100 engages with the protrusions 28 of the counter shaft 20 so that the counter driven gear 50 is integrally rotatable with the counter shaft 20. How the plate spring unit 100 engages with the protrusions 28 of the counter shaft 20 will be described later.

An area of the counter shaft 20 facing the through hole 51 of the counter driven gear 50 is provided with a gap 29 extending in the circumferential direction. Plural bearings (needle bearings) 24 being arranged so as to be spaced apart from one another may be provided at the gap 29. Each of the plural bearings 24 may be rotatable about a center axis extending in parallel to a center axis of the counter shaft 20.

Figure 3:
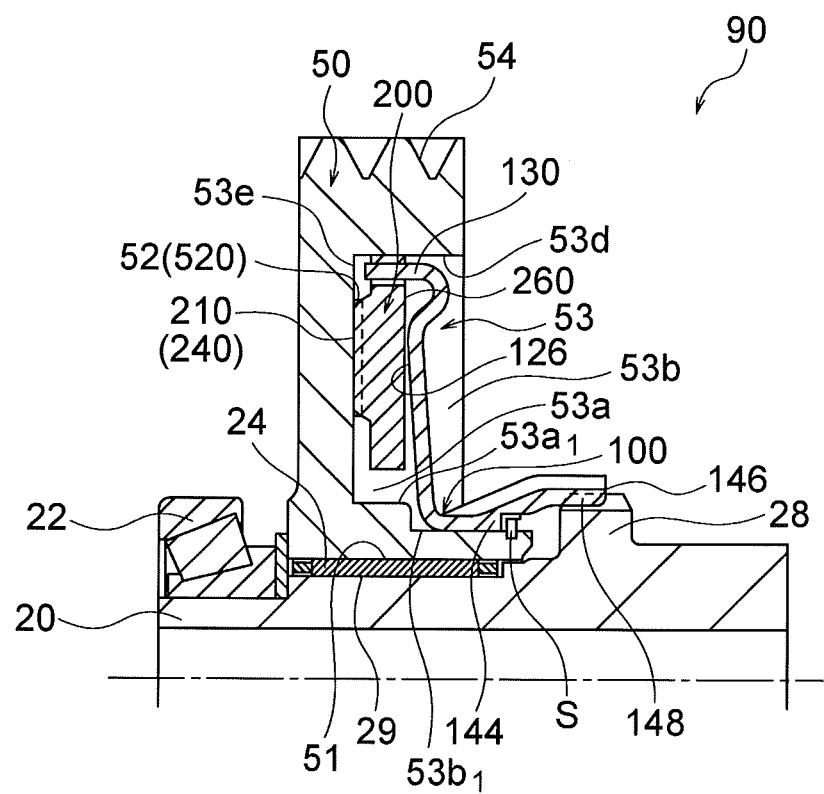
FIG. 3 is a cross sectional view schematically illustrating and partially enlarging a configuration of the torque limiter and components relating to the torque limiter.

FIG. 3 illustrates, as an example, a mode where the accommodation space 53 includes the first space 53*a* and the second space 53*b*. Alternatively, the accommodation space 53 may apply a mode where the accommodation space 53 includes a single space extending annularly.

FIG. 3 also illustrates a mode where the first face cam 52 is provided directly relative to the surface 53*e* of the counter driven gear 50 facing the plate spring unit 100. Alternatively, the first face cam 52 may be provided at (a surface facing the plate spring unit 100 of) an annular plate accommodated and fixed at the accommodation space 53 (for example, the first place 53*a*) of the counter driven gear 50.

Figure 4:
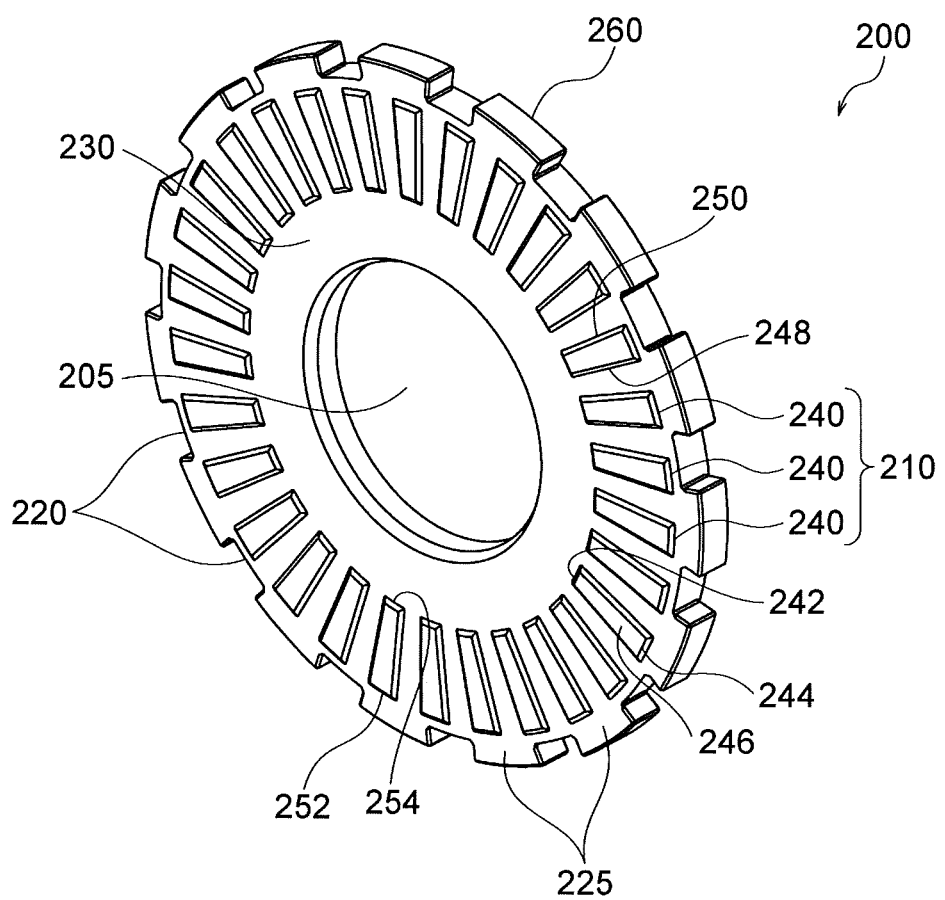
FIG. 4 is a perspective view schematically illustrating a configuration of a plate shown in FIG. 3.
Figure 5:
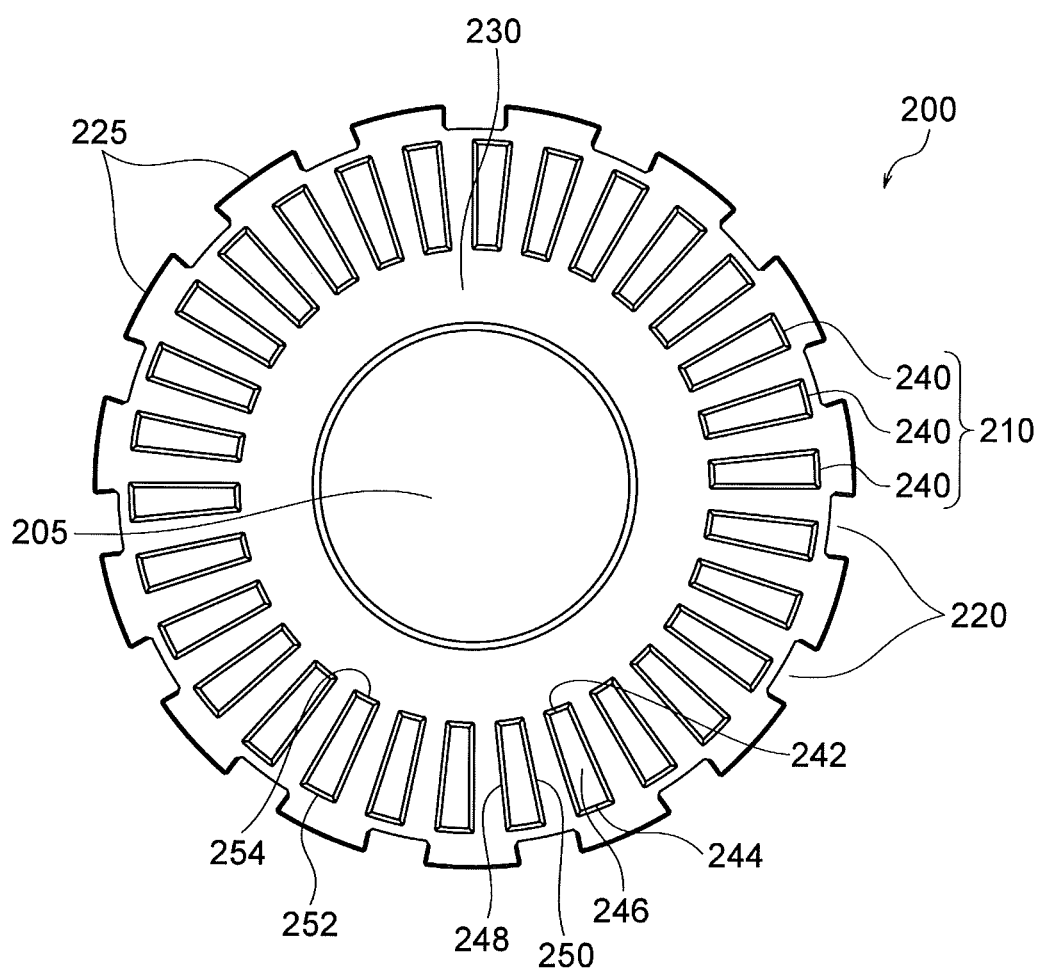
FIG. 5 is a front view schematically illustrating the configuration of the plate shown in FIG. 3.

Next, an example of a specific configuration of the plate 200 will be explained with reference to FIGS. 4 and 5 in addition to FIG. 3. As illustrated in FIGS. 4 and 5, the plate 200 includes an annular shape provided with the through hole 205 at a center portion, and is made of metal of, for example, iron, steel, aluminum alloy, or titanium alloy. The plate 200 includes recessed portions (engaged portions) 220 which are arranged along the outer circumference of the plate 200 so as to be spaced apart from one another, and protrusions 225 (engaged portions) which are arranged along the outer circumference of the plate 200 so as to be spaced apart from one another. That is, the single protrusion 225 is provided between the two recessed portions 220 which are adjacent to each other, and the single recessed portion 220 is provided between the two protrusions 225 which are adjacent to each other. Moreover, the plate 200 includes a second face cam 210 provided at a single surface (a surface facing the surface 53*e* of the counter driven gear 50) 230 (i.e., serving as a reference surface). The second face cam 210 includes plural teeth (second protrusions) that are arranged so as to be spaced apart from one another and that extends radially.

A tooth 240 (i.e., a second protrusion) is provided with a main surface 246, a first inclination surface 248, a second inclination surface 250, a third inclination surface 252, and a fourth inclination surface 254. The main surface 246 extends in a radial direction from a first end 242 to a second end 244 toward an outer circumferential rim of the surface 230 in a substantially parallel manner relative to the surface 230 (a first reference surface, a reference surface). The first inclination surface 248 extends in the radial direction by connecting between the main surface 246 and the surface 230. The second inclination surface 250 extends in the radial direction by connecting between the main surface 246 and the surface 230 while sandwiching the main surface 246 with the first inclination surface 248. The third inclination surface 252 extends in the radial direction towards the outer circumferential rim of the plate 200 from the second end 244 of the main surface 246, and inclines in a direction approaching a surface 230. The fourth inclination surface 254 extends in the radial direction toward the center axis of the plate 200 from the first end 242 of the main surface 246, and inclines in the direction approaching the surface 230. In the first embodiment, the main surface 246 includes a width increasing towards the second end 244 from the first end 242. Alternatively, in other embodiments, the main surface 246 may include a width decreasing towards the second end 244 from the first end 242, or a width substantially constant from the first end 242 to the second end 244.

Figure 6:
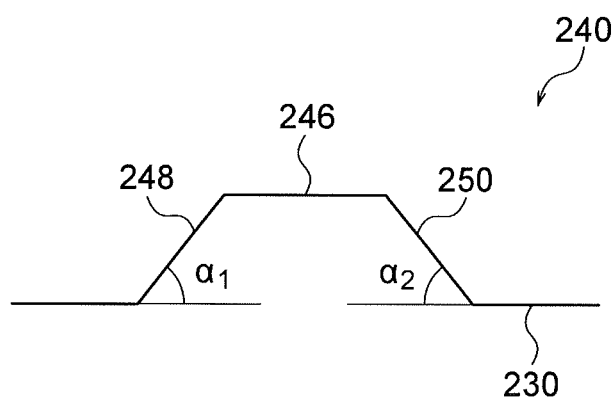
FIG. 6 is a view schematically illustrating a shape of tooth shown in FIGS. 4 and 5 when seen from a direction from an outer circumferential rim of the plate towards a center axis.

As shown in FIG. 6, an angle α that is formed by the first inclination surface 248 relative to the surface 230 is selectable from a range larger than 0 degree to equal to or smaller than 45 degrees. An angle $α_2$ that is formed by the second inclination surface 250 relative to the surface 230 is selectable from a range larger than 0 degree to equal to or smaller than 45 degrees. An angle $α_3$ that is not illustrated in FIG. 6 and that is formed by the third inclination surface 252 relative to the surface 230 is selectable from a range larger than 0 degree to equal to or smaller than 45 degrees. Similarly, an angle $α_4$ that is not illustrated in FIG. 6 and that is formed by the fourth inclination surface 254 relative to the surface 230 is selectable from a range larger than 0 degree to equal to or smaller than 45 degrees. In the first embodiment, all of $α_1$ to $α_4$ are set in 45 degrees. Alternatively, in other embodiments, $α_1$ to $α_4$ do not necessarily include the same degrees, and may be set in any degrees.

In a state where the first face cam 52 and the second face cam 210 are engaged with each other (a state illustrated in FIG. 3), the single tooth 520 of the first face cam 52 is disposed at an area between the two teeth 240, which are adjacent to each other, of the second face cam 210 (in other words, the single tooth 240 of the second face cam 210 is disposed at the area provided between the two teeth 520, which are adjacent to each other, of the first face cam 52). Accordingly, it is favorable that the tooth 520 of the first face cam 52 is appropriately disposed at an area provided between the two teeth 240, which are adjacent to each other, of the two face cam 210, and includes a shape that is appropriately engaged with the two teeth 240 which are adjacent to each other. In the first embodiment, the tooth 520 substantially includes the same or the similar shape as the tooth 240 of the aforementioned second face cam 210. That is, the tooth 520 may include a main surface, a first inclination surface, a second inclination surface, a third inclination surface, and a fourth inclination surface. The main surface extends in the radial direction from a first end to a second end toward an outer circumferential rim of the surface 53e (see FIG. 3) in a substantially parallel manner relative to a surface 53e (a second reference surface). The first inclination surface extends in the radial direction by connecting between the main surface and the surface 53e. The second inclination surface extends in the radial direction by connecting between the main surface and the surface 53e while sandwiching the main surface with the first inclination surface. The third inclination surface extends in the radial direction towards the outer circumferential rim of the counter driven gear 50 from a second end of the main surface, and inclines in a direction approaching the surface 53e. The fourth inclination surface extends in the radial direction toward the center axis of the counter driven gear 50 from a first end of the main surface, and inclines in the direction approaching the surface 53e. In a state where the first face cam 52 and the second face cam 210 are engaged with each other, the first inclination surface of the teeth 520 faces or is in contact with the first inclination surface 248 of the teeth 240, and the second inclination surface of the teeth 520 faces or is in contact with the second inclination surface 250 of the teeth 240, it is favorable that an angle formed by the first inclination surface of the teeth 520 relative to the surface 53e, and an angle formed by the second inclination surface relative to the surface 53e, are the same or similar to the inclination angle $\alpha_1$ of the first inclination surface 248 and the inclination angle $\alpha_2$ of the second inclination surface 250 of the teeth 240.

Figure 7:
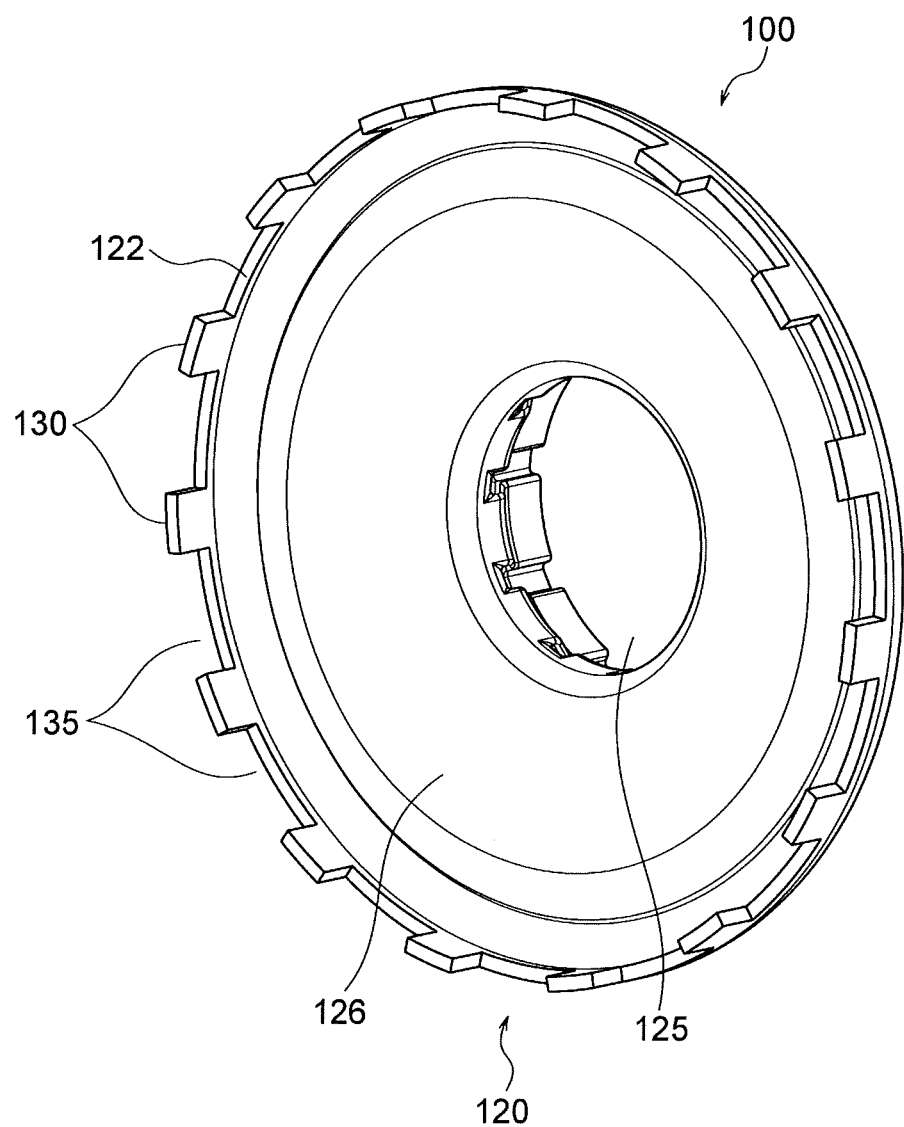
FIG. 7 is a perspective view schematically illustrating a configuration of a plate spring unit shown in FIG. 3 when seen from a side.
Figure 8:
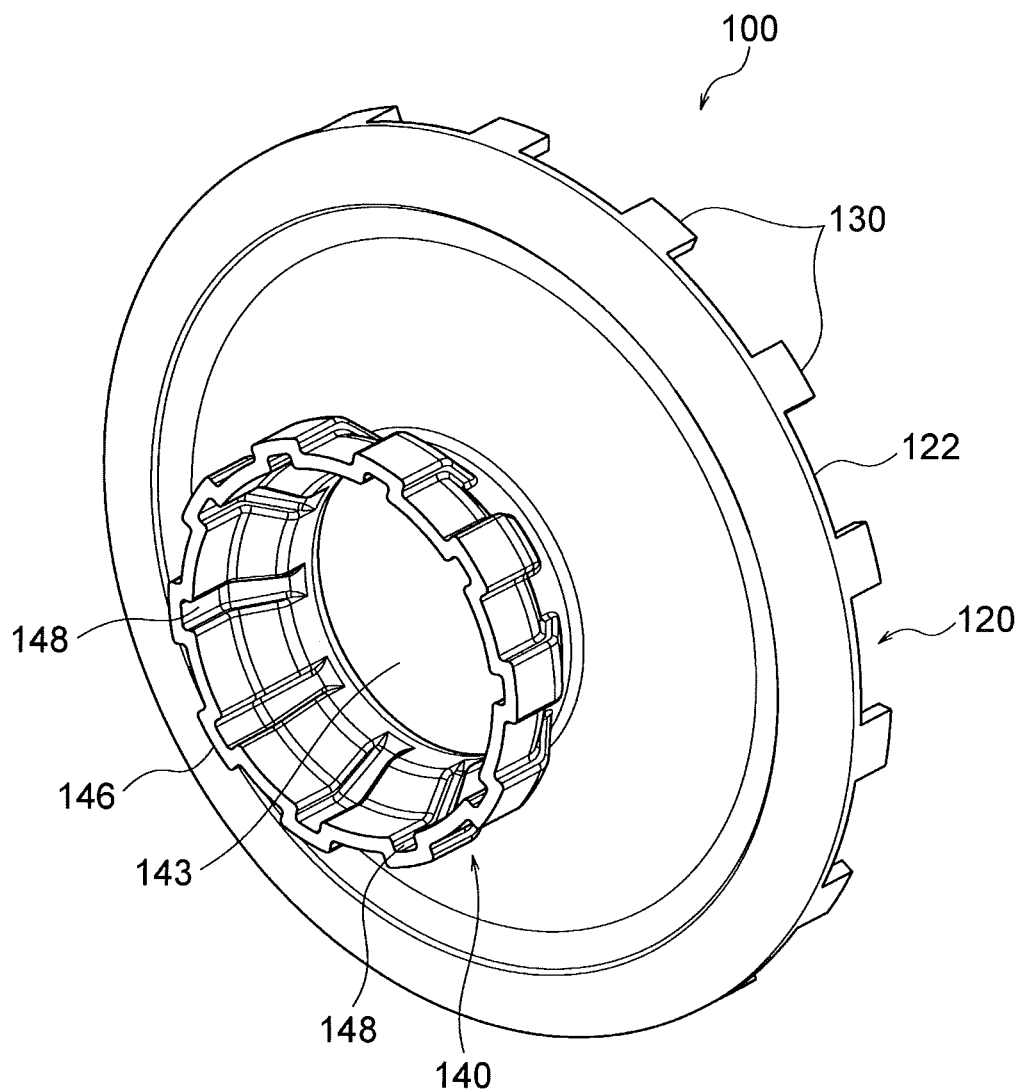
FIG. 8 is a perspective view schematically illustrating the configuration of the plate spring unit shown in FIG. 3 when seem from an opposite side of the side in FIG. 7.
Figure 9:
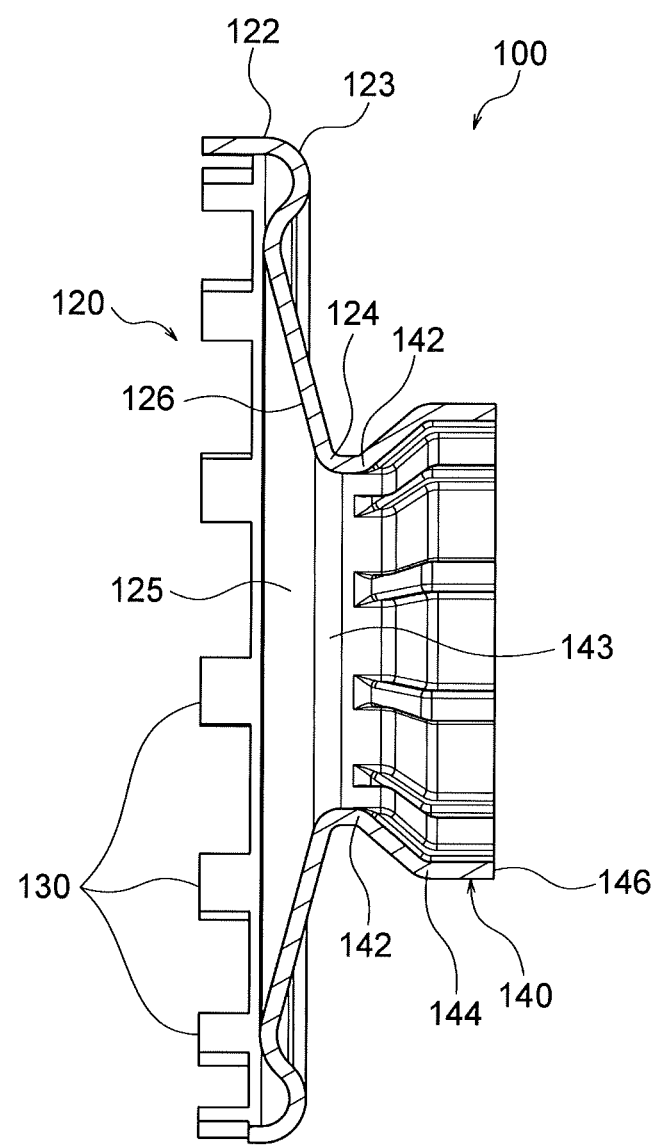
FIG. 9 is a cross sectional view illustrating the configuration of the plate spring unit shown in FIG. 3.

An example of the specific configuration of the plate spring unit 100 will hereunder be explained with reference to FIGS. 7 to 9 in addition to FIG. 3. Each of FIGS. 7 to 9 illustrates the plate spring unit 100 in a state of being not applied with an outer force.

The plate spring unit 100 is made of metal of, for example, iron, steel, aluminum alloy, or titanium alloy, and, broadly speaking, includes the disc spring portion 120 including an annular shape, and a support portion 140 that includes a cylindrical shape and that is integrally and coaxially formed with the disc spring portion 120.

The disc spring portion 120 extends from a first end 122 to a second end 124, and includes a curved portion 123 having a cross section of a substantially semicircular shape at the first end 122. The disc spring portion 120 extends so that the radius thereof decreases towards a center axis between the curved portion 123 and the second end 124. The disc spring portion 120 includes a through hole 125 at the second end 124. The disc spring portion 120 includes the plural protrusions (engaging portion) 130 being arranged at the first end 122 so as to be spaced apart from one another, and the plural recessed portion (engaging portion) 135 being arranged at the first end 122 so as to be spaced apart from one another. That is, the single recessed portion 135 is provided between the two protrusions 130, which are adjacent to each other, and the single protrusion 130 is provided between the two recessed portions 135 which are adjacent to each other.

In the first embodiment, the protrusions 130, the recessed portions 135, and a part between the first end 122 and the curved portion 123 (including the recessed portion 123) of the disc spring portion 120 may include high stiffness, and a part between the curved portion 123 and the second end 124 (excluding the curved portion 123) of the disc spring portion 120 may include high flexibility (easy to bend).

Alternatively, all of the protrusion 130, the recessed portion 135, and the part between the first end 123 and the second end 124 may include high flexibility (easy to bend).

The support portion 140 extends so that the radius thereof increases towards an intermediate portion 144 from a first end 142, and extends so that the radius thereof is substantially constant from the intermediate portion 144 to a second end 146. The support portion 140 includes a through hole 143 at the first end 142. The support portion 140 is integrally connected to the second end 124 of the disc spring portion 120 at the first end 142. Accordingly, the through hole 143 of the support portion 140 is communicated with the through hole 125 of the disc spring portion 120.

The support portion 140 includes plural groove portions 148 that extend in the axial direction and that are arranged at an inner circumferential surface of the support portion 140 so as to be spaced apart from one another.

The plate spring unit 100 illustrated in FIGS. 7 to 9 is mounted, as shown in FIG. 3, in a state of sandwiching the plate 200 shown in FIGS. 4 and 5 with the counter driven gear 50. Specifically, the plate 200 and the plate spring unit 100 are disposed so that a surface 260 facing a surface 230 of the plate 200 shown in FIGS. 4 and 5, and a surface 126 of the plate spring unit 100 shown in FIGS. 7 to 9 face with each other. In this state, the plate spring unit 100 is mounted on the plate 200 so that each of the protrusions (the engaging portions) 130 of the plate spring unit 100 engages with the corresponding recessed portion 220 of the plural recessed portions (the engaged portions) 220 of the plate 200, and so that each of the recessed portions (the engaging portions) 135 of the plate spring unit 100 engages with each of the plural protrusions (the engaged portions) 225 of the plate 200. In the first embodiment, the protrusion 130 may be press-fitted into the recessed portion 220, and the protrusion 225 may be press-fitted into the recessed portion 135, or the protrusion 130 may be welded with the recessed portion 220, and the protrusion 225 may be welded with the recessed portion 135 in order to reduce the sliding (the frictional force) between the protrusion 130 of the plate spring unit 100 and the recessed portion 220 of the plate 200, and the recessed portion 135 of the plate spring unit 100 and the protrusion 225 of the plate 200.

Next, as shown in FIG. 3, the first inner circumferential wall $53a_1$ of the counter driven gear 50 is provided in the through hole 205 of the plate 200, and the second inner circumferential wall $53b_1$ of the counter driven gear 50 is provided in the through hole 125 of the disc spring portion 120 and the through hole 143 of the support portion 140. At the same time, the corresponding protrusion 28 of the plural protrusions 28 provided at the counter shaft 20 is engaged with each of the groove portions 148 provided at the support portion 140 of the plate spring unit 100. Then, the disc spring portion 120 is mounted on the counter driven gear 50 as illustrated in FIG. 3 by fixing the support portion 140 (for example, the intermediate portion 144) to the second inner circumferential wall $53b_1$ in a state where the surface 126 (a surface facing the counter driven gear 50) is pressed towards the plate 200 until inclining by having a slight angle (for example, five degrees) relative to the surface 260 of the plate 200, and is disposed inside the second space 53b.

As illustrated in FIG. 3, the plate spring unit 100 may be fixed to the counter driven gear 50 by a snap ring S that is disposed between a cutout extending annularly in the circumferential direction at the intermediate portion 144 of the support portion 140 and a groove facing the cutout and extending annularly in the circumferential direction at the counter driven gear 50. Accordingly, the support portion 140 may be inhibited from moving in a direction (in the right direction in FIG. 3) away from the first face cam 52 along the axial direction.

As such, the plate spring unit 100 together with the plate 200 is fixed to the counter driven gear 50, and is fixed to the counter shaft 20. Here, as illustrated in FIG. 3, the second face cam 210 provided at the plate 200 faces and meshes with the first face cam 52 provided at the counter driven gear 50. Each of the groove portions 148 provided at the support portion 140 of the plate spring unit 100 engages with (is inserted with) the corresponding protrusion 28 of the plural protrusions 28 provided at the counter shaft 20. Under this state, when the counter driven gear 50 rotates, the groove portion 148 provided at the support portion 140 of the plate spring unit 100 comes in contact with the protrusion 28 of the counter shaft 20 that is engaged with the groove portion 148, and presses the protrusion 28 in the circumferential direction. Accordingly, the plate spring unit 100 (,plate 200 and the counter driven gear 50) may integrally rotate with the counter shaft 20.

Next, the operation of a torque connection and disconnection function of the torque limiter 90 including the aforementioned configuration will hereunder be explained with reference to FIGS. 10A to 10F.

Figure 10A:
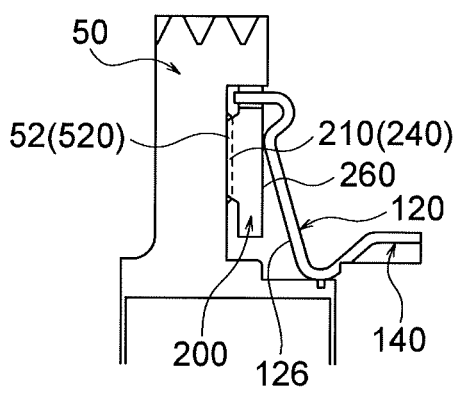
FIGS. 10A, 10B, 10C, 10D, 10E, and 10F are explanatory views schematically illustrating an operation of the torque limiter shown in FIG. 3.

FIG. 10A illustrates a positional relationship between the first face cam 52 and the second face cam 210 before the plate spring unit 100 is mounted on the counter driven gear 50 (free state). FIG. 10C illustrates the positional relationship between the first face cam 52 and the second face cam 210 in a mounted state (normal state) of the plate spring unit 100 relative to the counter driven gear 50. FIG. 10E illustrates the positional relationship between the first face cam 52 and the second face cam 210 in a state where the release torque is inputted to the second face cam 210 (the first face cam 52). Each of FIGS. 10B, 10D, 10F illustrates a relationship between a load applied to the disc spring portion 120 and a stroke (a displacement) of the disc spring portion 120 corresponding to each of the relationships shown in FIGS. 10A, 10C, 10E.

Figure 10B:
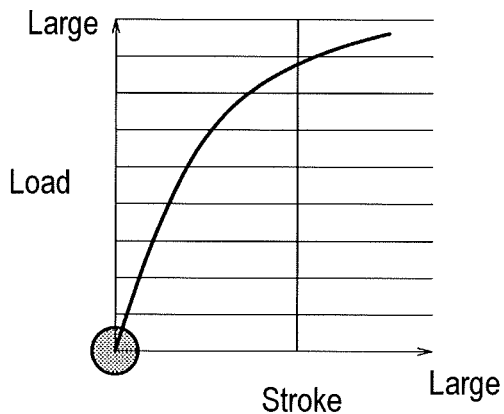
Figure 10C:
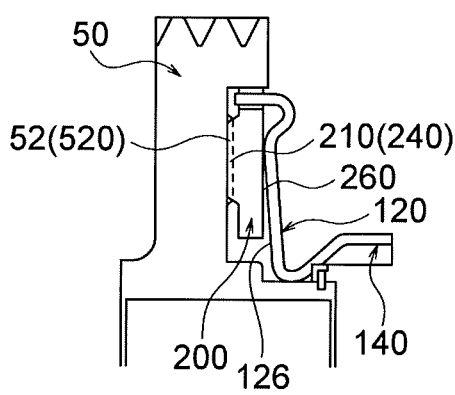

In FIGS. 10A and 10B, in a state where the disc spring portion 120 of the plate spring unit 100 is not applied with the outer force (free state), the surface 126 of the disc spring portion 120 inclines by having an angle relative to the surface 260 of the plate 200 larger than an angle relative to the surface 260 of the plate 200 shown in FIG. 10C. In this state, because the disc spring portion 120 is not applied with the load, the stroke of the disc spring portion 120 is zero as shown in FIG. 10B.

Figure 10D:
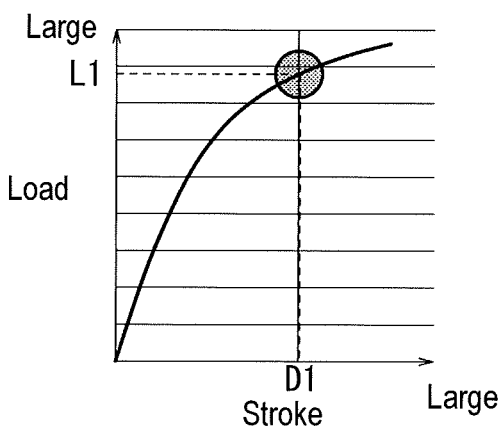
Figure 10E:
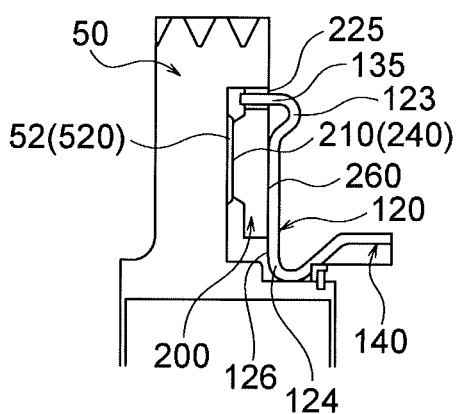

Next, in FIGS. 10C and 10D, in a state where the plate spring unit 100 is mounted on the counter driven gear 50, the surface 126 of the disc spring portion 120 inclines by having an angle relative to the surface 260 of the plate 200 smaller than the angle in FIG. 10A because the disc spring portion 120 is applied with the load in a direction opposite to the first face cam 52. In this state, as illustrated in FIG. 10D, because the disc spring portion 120 is applied with a load $L_1$ that is towards the direction opposite to the first face cam 52 along the axial direction, the stroke of the disc spring portion 120 results in $D_1$.

Figure 10F:
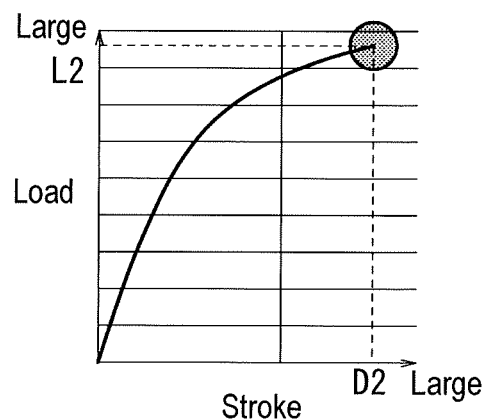

In FIGS. 10E and 10F, the release torque is inputted to the second face cam 20 (or the first face cam 52). When the torque in the circumferential direction relative to the second face cam 210 or the first face cam 52 is inputted, the tooth 240 is applied with a force (load) towards a direction opposite to the first face cam 52 along the axial direction because the tooth 240 of the second face cam 210 and the tooth 520 of the first face cam 42 are in contact with each other via the inclination surfaces (the first inclination surface 248 and the second inclination surface 250 of the teeth 240, and the first inclination surface and the second inclination surface of the teeth 520). Accordingly, the plate 200 provided with the teeth 240 is displaced in a direction opposite to the first face cam 52. As such, when the plate 200 is displaced, the recessed portion (the engaging portion) 135 of the disc spring portion 120 being engaged with the protrusion (the engaged portion) 225 of the plate 200 is pressed in a direction opposite to the plate 200 from the protrusion 225 of the plate 200. In the first embodiment, as described above, because the protrusion 130, the recessed portion 135, and the part from the first end 122 to the curved portion 123 of the disc spring portion 120 include high stiffness (difficult to bend), the part between the curved portion 123 and the second end 124 of the disc spring portion 120 (excluding the bending portion 123) mainly bends. Thus, when the disc spring portion 120 is pressed in a direction opposite to the plate 200 from the protrusion 225 of the plate 200, the surface 126 of the disc spring portion 120 bends to decrease the angle relative to the surface 260 of the plate 200.

Here, in a case where torque inputted to the second face cam 210 or the first face cam 52 reaches the release torque, as illustrated in FIG. 10F, the stroke of the disc spring portion 120 comes to be $D_2$ by the application of the load $L_2$ towards a direction opposite to the first face cam 52 along the axial direction to (the recessed portion 135 of) the disc spring portion 120 via the plate 200. That is, the surface 126 of the disc spring portion 12 bends so as to be substantially parallel to the surface 260 of the plate 200. Only after a state where the surface 126 of the disc spring portion 120 is substantially in parallel to the surface 260 of the plate 200, the disc spring portion 120 allows to release the engagement between the first face cam 52 and the second face cam 210. As such, when the release torque is inputted to the first face cam 52 or the second face cam 210, the transmission of the torque between the first face cam 52 and the second face cam 210 is configured to be disconnected by the displacement of the disc spring portion 120 by the stroke $D_2$ by the application of the load $L_2$.

FIGS. 10B, 10D, 10F show that, when the load applied to the disc spring portion 120 is within a range of zero to $L_1$, the amount of stroke increasing when the load increases by a constant amount is relatively small. On the other hand, when load applied to the disc spring portion 120 is within $L_1$ to $L_2$, the amount of stroke increasing when the load increases by a constant amount increases. By the use of the disc spring portion 120 having this characteristic, the second face cam 210 continues to engage with the first face cam 52 until a torque smaller than the release toque is inputted, and when the torque equal to or greater than the release torque is inputted, the second face cam 210 may release the engagement relative to the first face cam 52 promptly.

When the release torque is inputted, the plate spring unit 100 performing the aforementioned torque connection/disconnection function bends so as to displace the recessed portion 135 and the protrusion 130 in a direction opposite to the first face cam 52 to disengage the second face cam 210 from the first face cam 52. The disc spring portion 120 of the plate spring unit 100 is integrally provided with the support portion 140 which is inhibited from sliding in a direction opposite to the first face cam 52 along the axial direction. Moreover, the plate 200 and the disc spring portion 120 practically engages with (connects to) each other so as not to slide via the recessed portion 220 and the protrusion 225 serving as the engaged portion of the plate 200, and the protrusion 130 and the recessed portion 135 serving as the engaging portion of the disc spring portion 120. Accordingly, almost no part of the whole of the plate spring unit 100 and the whole of the plate 200 slides relative to other components (especially counter driven gear 50). Accordingly, the release torque is inhibited from varying by the size of the frictional force resulted in the sliding part, and the maximum release torque may be engaged.

In addition, as described above, the plate spring unit 100 and the plate 200 do not practically include a sliding part (a sliding member) relative to other components, the sliding member including a large inertia amount is not practically included. Thus, even in a case where the high-frequency impact load is inputted, the plate spring unit 100 may release the engagement of the second face cam 210 and the first face cam 52 more securely. Accordingly, the release torque may be inhibited from varying depending on the size of the frictional force resulted by the sliding part. Accordingly, the maximum release torque may be reduced.

Because the disc spring portion 120 is integrally molded with the support portion 140 supporting the disc spring portion 120, the number of components may be reduced. Accordingly, the cost required to establish the torque limiter may be reduced.

In the disclosure disclosed in Patent reference 1, when a first rotary member (a reference number 35 of Patent reference 1) and a second rotary member (a reference number 35) that are meshed with each other are inputted with an excessive torque, the first rotary member moves in a direction of a tooth surface. When even slightly moving in the direction of the tooth surface, the first rotary member is shifted to a state of coming in contact with the second rotary member only at the outer diameter of the tooth surface from a state of being in contact with the second rotary member at the whole surface of the tooth. Accordingly, the stress is concentrated at the outer diameter of the tooth surface. As a result, the tooth surface may be damaged depending on the strength of the materials of the first rotary member and the second rotary member. The strength of the tooth surface may be required to be secured by, for example, increasing the thickness of the tooth surface in order to prevent the damage. Thus, members constituting the first rotary member and the second rotary member may be inevitably upsized.

As described above, when the first rotary member and/or the second rotary member is/are inputted with the excessive torque, the reason why the stress concentrates on the outer diameter of the tooth surface is as follows. In the disclosure disclosed in Patent reference 1, each of the plural teeth provided at the bottom surface of the first rotary member and the bottom surface of the second rotary member and extending radially includes an inclination surface having 45 degrees relative to the bottom surfaces. The inclination surface of the tooth of the first rotary member and the inclination surface of the tooth of the second rotary member are in contact, or face with each other so that the first rotary member and the second rotary member mesh with each other.

The moving amount of the first rotary member in the axial direction when moving in the direction of the tooth surface in response to the excessive torque will be calculated with a formula as follows.

The moving amount in the axial direction=radius×Tan (angle (45 degrees fixed) of the tooth surface)×rotary angle. (The moving amount in the axial direction is calculated by multiplying the radius, Tan (angle (45 degrees fixed) of the tooth surface), and the rotary angle)

That is, the moving amount in the axial direction decreases towards the inner diameter of the tooth, and the moving amount in the axial direction increases towards the outer diameter of the tooth. However, in practice, when moving in the direction of the tooth surface, the whole first rotary member is lifted up in the axial direction in accordance with the moving amount of the outer diameter of the tooth. Here, a gap is generated between the tooth of the first rotary member and the tooth of the second rotary member facing with the first rotary member at the diameter inwardly of the outer diameter. Thus, the first rotary member and the second rotary member are in contact with each other only at the respective outer diameter sides of the teeth.

Here, in the first embodiment of the disclosure, the teeth 240 of the second face cam 210 are provided so as to be contact with the teeth 520 at any radius without displacing the part where the teeth 240 of the second face cam 210 are in contact with the teeth 520 of the first face cam 52 in the radial direction when the second face cam 210 slides relative to the first face cam 52.

In a case where the teeth 240 rotates by the same or similar rotary angle, it is not favorable that the moving amount in the axial direction differs by the radius of the tooth 240 extending in the radial direction. If the tooth 240 is configured so as to include the moving amount in the axial direction that is constant at any radius, the teeth 240 may always be in contact with the teeth 520 at any radius.

Specifically, by changing the angle of the tooth surface (which serves as an element of the formula) continuously by radius, not always being in constant (for example, 45 degrees) over the whole radial direction of the tooth, the moving amount in the axial direction may be constant at any radius.

The moving amount in the axial direction=radius×Tan (angle of the tooth surface)×rotary angle. (The moving amount in the axial direction is calculated by multiplying the radius, Tan (angle of the tooth surface), and the rotary angle)

Figure 11:
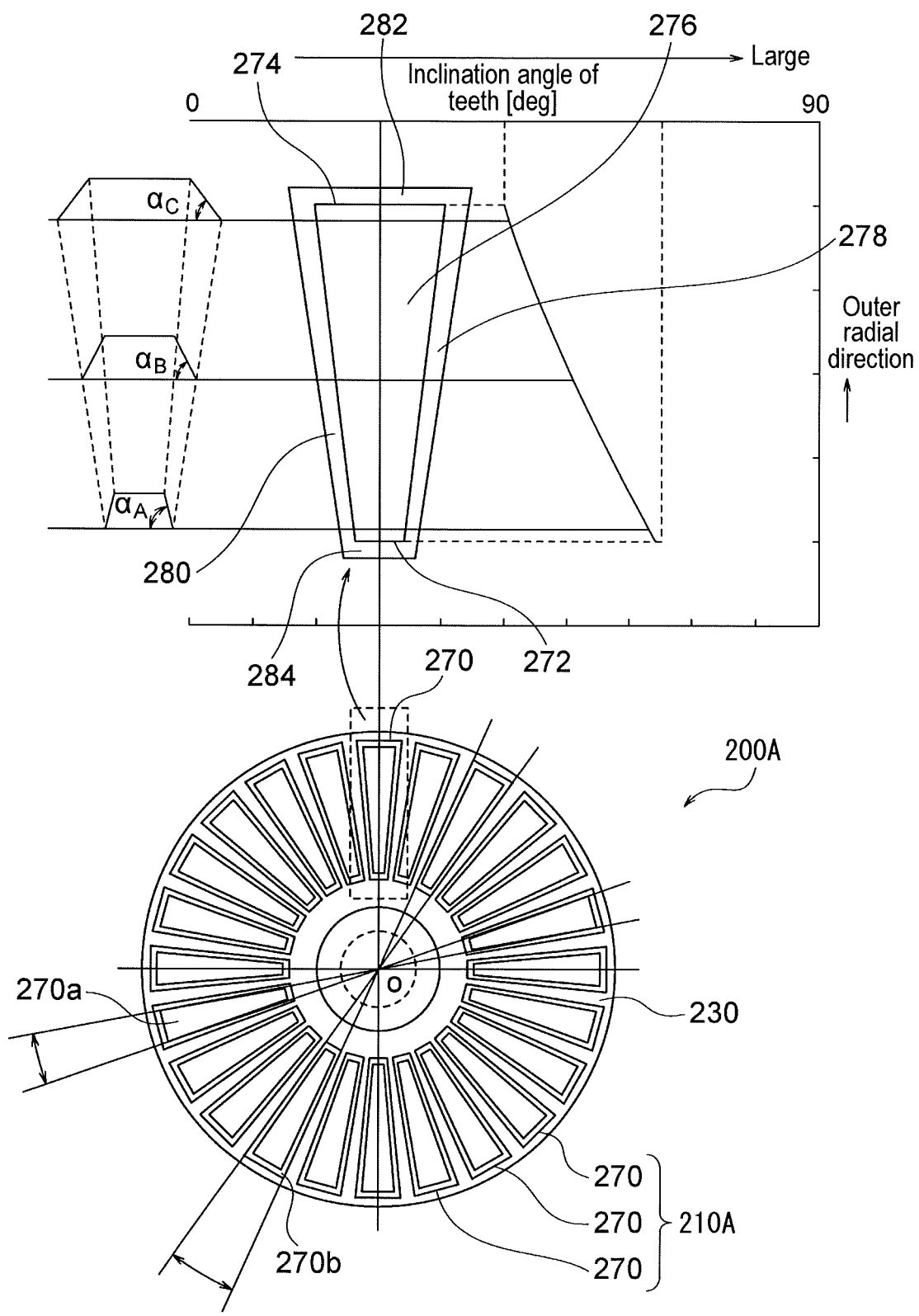
FIG. 11 is a view schematically illustrating a configuration of a second face cam formed at a plate which is included in a torque limiter according to a second embodiment of this disclosure.

A second embodiment will hereunder be explained. As shown in FIG. 11, a second face cam 210A includes plural teeth 270 (i.e., a second protrusion) being arranged at the surface 230 of a plate 200A so as to be spaced apart from one another and extending radially.

The tooth 270 includes a main surface 276, a first inclination surface 278, a second inclination surface 280, a third inclination surface 282, and a fourth inclination surface 284. The main surface 276 extends in a radial direction from a first end 272 to a second end 274 towards an outer circumferential rim of the surface 230 in a substantially parallel manner relative to the surface 230. The first inclination surface 278 extends in the radial direction by connecting between the main surface 276 and the surface 230. The second inclination surface 280 extends in the radial direction by connecting between the main surface 276 and the surface 230 while sandwiching the main surface 276 with the first inclination surface 278. The third inclination surface 282 extends in the radial direction towards the outer circumferential rim of the plate 200A from the second end 274 of the main surface 276 and inclines in a direction approaching the surface 230. The fourth inclination surface 284 extends in the radial direction towards the center axis of the plate 200A from the first end 272 of the main surface 276 and inclines in the direction approaching the surface 230.

FIG. 11 illustrates, as an example, an angle $\alpha_A$ that is formed by the first inclination surface 278 (and the second inclination surface 280) at the inner diameter of the teeth 270 relative to the surface 230, an angle $\alpha_B$ that is formed by the first inclination surface 278 (and the second inclination surface 280) in the vicinity of a center of the teeth 270 relative to the surface 230, and an angle $\alpha_C$ that is formed by the first inclination surface 278 (and the second inclination surface 280) at the outer diameter of the teeth 270 relative to the surface 230. The relationship in which $\alpha_A$ is greater than $\alpha_B$ that is greater than $\alpha_C$ is fulfilled.

Figure 12:
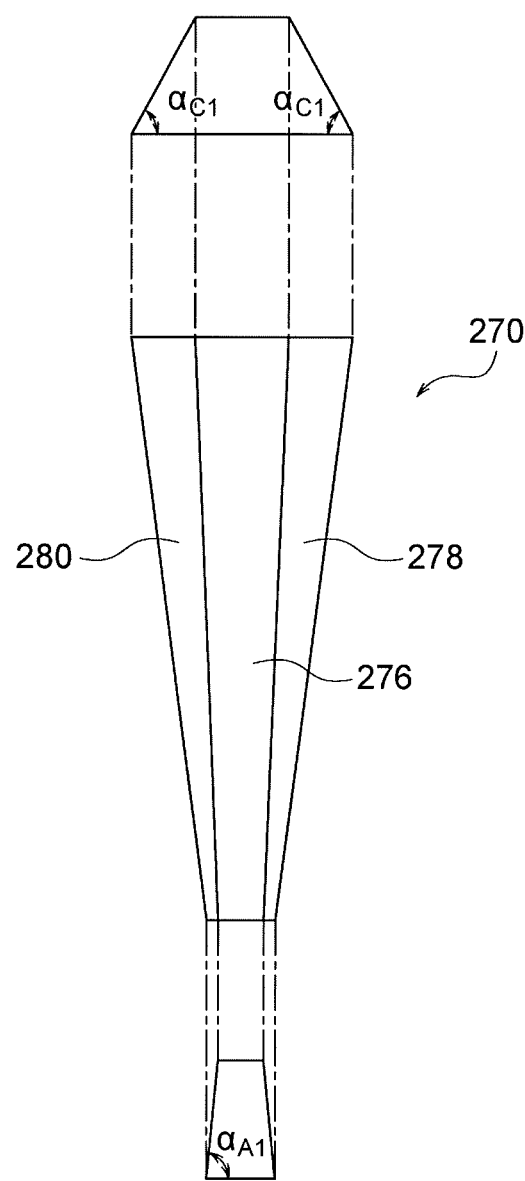
FIG. 12 is an enlarged view schematically illustrating a part of tooth which is included in the second face cam shown in FIG. 11.

A middle level of FIG. 12 schematically illustrates a part of the tooth 270 that is seen from a side facing the surface 230 of the plate 200A. A top level of the FIG. 12 illustrates a shape of the part of the tooth 270 that is illustrated in the middle level, the shape seen from a direction towards the center axis from the outer circumferential rim of the plate 200A. A bottom level of FIG. 12 illustrates a shape of the part of the tooth 270 that is illustrated in the middle level, the shape seen from a direction towards the outer circumferential rim from the center axis of the plate 200A.

FIG. 12 illustrates an angle $\alpha_{A\_1}$ which is formed by the first inclination surface 278 (and the second inclination surface 280) relative to the surface 230 at the inner diameter of the teeth 270, and an angle $\alpha_{C\_1}$ which is formed by the first inclination surface 278 (and the second inclination surface 280) relative to the surface 230 at the outer diameter of the teeth 270. FIG. 12 further shows that the relationship in which $\alpha_{A1}$ is greater than $\alpha_{C\_1}$ is fulfilled.

As illustrated in FIGS. 11 and 12, because a method in which the angle formed by the first inclination surface 278 (and the second inclination surface 280) relative to the surface 230 is set to decrease continuously towards the outer circumferential rim from the center axis of the plate 200A along the radial direction of the teeth 270 is adapted, the moving amount of the teeth 270 in the axial direction may be constant at any diameters. As shown in FIG. 1, this method corresponds to the forming of the teeth 270 such that a rotary center of a top surface 270a of the tooth 270 and a bottom surface 270b of the tooth 270 correspond to a rotary center O of the plate 200A.

The single tooth 520 of the first face cam 52 is disposed between the two teeth 270, which are adjacent to each other, of the second face cam 210A. Accordingly, the tooth 520 may include the first inclination surface and the second inclination surface in a state of being disposed between the two adjacent teeth 270, the first inclination surface that appropriately comes in contact or faces with the first inclination surface 278 of the one of the teeth 270, the second inclination surface that appropriately comes in contact or faces with the second inclination surface 280 of the other of the teeth 270. For example, the teeth 520 may include substantially the same shape as the teeth 270 explained with reference to FIGS. 11 and 12.

As such, the teeth 270 according to the second embodiment may inhibit a specific part of the teeth 270 (or the teeth 520) in the radial direction from being concentrated with a stress when the teeth 270 moves in the axial direction caused by the excessive torque is inputted to the second face cam 210A or the first face cam 52. Accordingly, because the strength condition relative to the second face cam 210A and/or the first face cam 52 may be eased, the plate 200A provided with the second face cam 210A and/or the counter driven gear 50 provided with the first face cam 52 may be downsized and lightened in weight. Accordingly, devices (for example, vehicles) on which the torque limiters of the first and second embodiments are mounted may be downsized and lightened in weight.

In the aforementioned embodiment with reference to FIGS. 3 to 9, in a case where a torque equal to or greater than a predetermined value is inputted to the first face cam 52 or the second face cam 210A, when one face cam of the first face cam 52 and the second face cam 210A rotates in the circumferential direction relative to the other face cam of the first face cam 52 and the second face cam 210A, a contact point between the teeth 270 and the teeth 520 may be parts of outermost diameters of the teeth 270 and the teeth 520 because the teeth 270 (the teeth 520) moves greater at the outer diameter relative to the inner diameter in the circumferential direction.

In a third embodiment, a tooth depth of the tooth 270 (the tooth 520) may be tapered toward the outer diameter to inhibit the aforementioned phenomenon.

Figure 13:
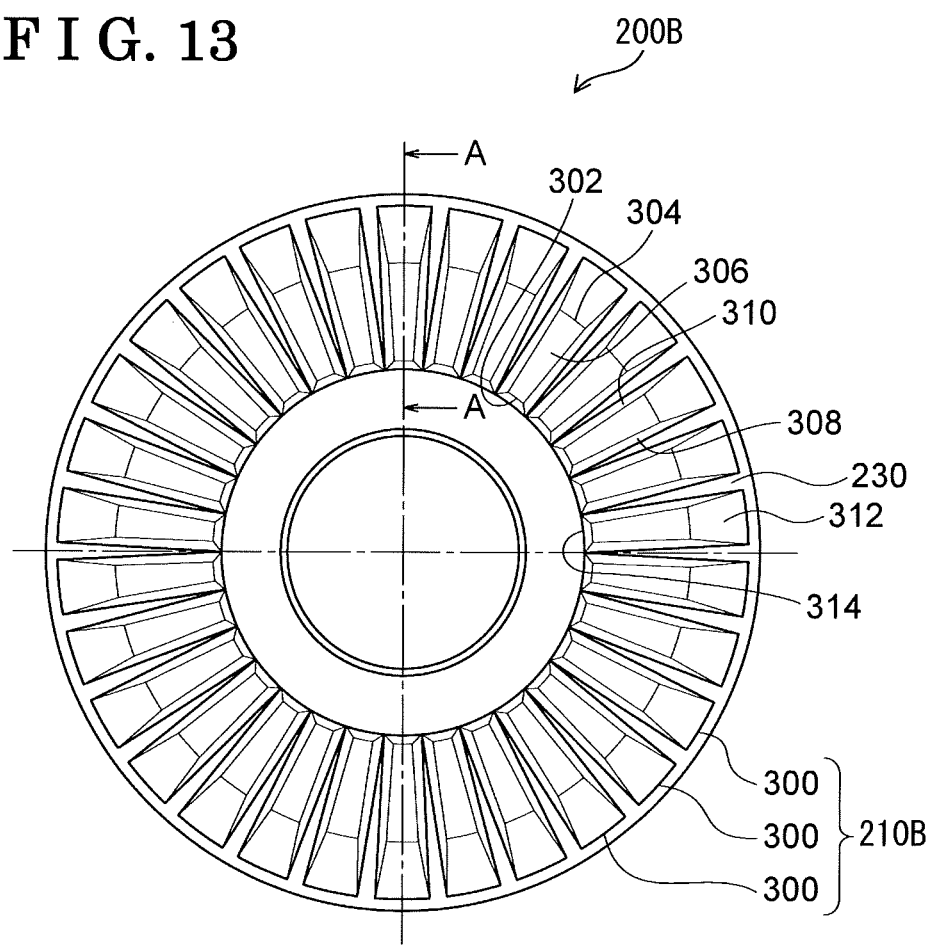
FIG. 13 is a side view schematically illustrating a configuration of a plate which is included in a torque limiter according to a third embodiment of this disclosure.

The details of the third embodiment will hereunder be explained. As illustrated in FIG. 13, a second face cam 210B includes plural teeth 300 (i.e., a second protrusion) that are arranged at the surface 230 of a plate 200B so as to be spaced apart from one another and that extend radially. The tooth 300 includes a main surface 306, a first inclination surface 308, a second inclination surface 310, a third inclination surface 312, and a fourth inclination surface 314. The main surface 306 extends in a radial direction from a first end 302 to a second end 304 towards the outer circumferential rim of the surface 230 in a substantially parallel manner relative to the surface 230. The first inclination surface 308 extends in the radial direction by connecting between the surface 306 and the surface 230. The second inclination surface 310 extends in the radial direction by connecting between the main surface 306 and the surface 230 while sandwiching the main surface 306 with the first inclination surface 308. The third inclination surface 312 extends in the radial direction towards the outer circumferential rim of the plate 200B from the second end 304 of the main surface 306, and inclines in the direction approaching the surface 230. The fourth inclination surface 314 extends in the radial direction towards the center axis of the plate from the first end 302 of the main surface 306, and inclines in the direction approaching the surface 230.

An angle $\beta_3$ (see FIG. 14) formed by the third inclination surface 312 relative to the surface 230 is set smaller than the angle $\alpha_1$ formed by the first inclination surface 308 relative to the surface 230, the angle $\alpha_2$ formed by the second inclination surface 310 relative to the surface 230, and the angle $\alpha_4$ formed by the fourth inclination surface 314 relative to the surface 230. Accordingly, the teeth 300 may include a thickness that is constant from the first end 302 to the second end 304, and may include a thickness that decreases towards the outer circumferential rim of the plate 200B from the second end 304.

Accordingly, in a case where the first face cam 52 or the second face cam 210B is inputted with torque that is equal to or greater than a predetermined value, the teeth 300 and the teeth 520 are disengaged from each other from the outer diameters thereof by the start of the rotation of the one of the first face cam 52 and the second face cam 210B relative to the other of the first face cam and the second face cam 210B in the circumferential direction. Because the contact point between the teeth 300 and the teeth 520 changes from the outer diameter to the inner diameter thereof, a tooth surface separation force Ft (torque T is divided by a contact diameter R) caused by the torque may be increased. Because the tooth separation force is increased, the tooth 300 and the tooth 520 are disengaged from each other immediately by the start of the moving of the tooth 300 and the tooth 520 on the tooth surface. Accordingly, the excessive, impact torque is prevented from being inputted to the first face cam 52 or the second face cam 210B.

Figure 14:
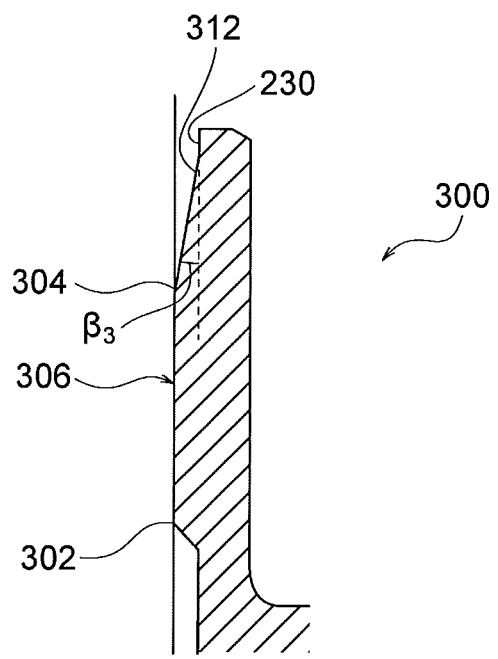
FIG. 14 is a cross sectional view taken along a flat surface of A-A, the view schematically illustrating a configuration of a tooth formed at the plate shown in FIG. 14.

Here, the tooth 300 constituting the second face cam 210B includes a shape shown in FIGS. 13 and 14. Alternatively, a tooth constituting at least one of the first face cam 52 and the second face cam 210B may include a shape shown in FIGS. 13 and 14.

According to the aforementioned first, second and third embodiments, the torque limiter operating the torque connection/disconnection function between the input shaft and the output shaft uses the counter driven gear 50 as the input shaft and the counter shaft 20 as the output shaft. Alternatively, the technical ideas disclosed in the disclosure is applicable in a case where the torque connection/disconnection function (and the drive force connection/disconnection function) is performed between any input shafts and any output shafts transmitting the drive force of a drive motor (including engines and motors).

In the aforementioned embodiment, the disc spring portion 120 includes the protrusion 130 and the recessed portion 135 as the engaging portion, and the plate 200B includes the recessed portion 220 and the protrusion 225 as the engaged portion in order to connect the disc spring portion 120 to the plate 200B. Alternatively, the disc spring portion 120 may use the outer circumferential rim (the first end 122 extending annularly) extending annularly as the engaging portion, and the plate 200B may use (a part facing the first end 122 of the disc spring portion 120 extending annularly of) the surface 260 as the engaged portion to connect the disc spring portion 120 to the plate 200B. In this case, it is favorable that the first end 122 of the spring plate portion 120 is fixed to the surface 260 of the plate 200B by, for example, welding, in order to securely inhibit the first end 122 of the disc spring portion 120 extending annularly and the surface 260 of the plate 200B from sliding on each other.

The torque limiter 90 according to the first, second and third embodiment of the disclosure includes the first meshing portion (52) being provided at the surface of the input shaft (50) which transmits the drive force of the drive motor, the surface intersecting with the axial direction of the input shaft (50), the plate (200, 200A, 200B) being formed in the annular shape, being provided coaxially with the input shaft (50), and including the second meshing portion (210, 210A, 210B) which faces the first meshing portion (52) in the axial direction and which is configured to mesh with the first meshing portion (52), and the disc spring portion (120) being integrally rotatable with the output shaft (20) which is provided coaxially with the input shaft (50) and which is rotatable relative to the input shaft (50), the disc spring portion (120) including the engaging portion (130, 135) engaging with the plate (200, 200A, 200B), the disc spring portion (120) being deflected to displace the engaging portion (130, 135) in the direction opposite to the plate (200, 200A, 200B) in a case where the load equal to or greater than the set value is applied to the disc spring portion (120) while pressing the plate (200, 200A, 200B) via the engaging portion (130, 135) so as to bias the second meshing portion (210, 210A, 210B) towards the first meshing portion (52).

According to the configuration, in a case where the predetermined torque is inputted, the engaging portion 130, 135 of the disc spring portion 120 engaging with the plate 200, 200A, 200B bends so that the engaging portion 130, 135 is displaced in the direction opposite to the first meshing portion (the first face cam 52) provided at the input shaft (the counter driven gear 50) to move the second meshing portion (the second face cam 210, 210A, 210B) provided at the plate 200, 200A, 200B in the direction opposite to the first meshing portion (the first face cam 52). Accordingly, the meshing of the first meshing portion (52) and the second meshing portion (210, 210A, 210B) may be released, and the transmission of the torque may be disconnected between the input shaft (50) and the output shaft (for example, the counter shaft 20). Accordingly, the torque limiter 90 available of torque connection/disconnection function may be provided.

According to the aforementioned first, second and third embodiments, the plate (200, 200A, 200B) includes the plural engaged portions (220, 225) that are arranged along an outer circumference of the plate (200, 200A, 200B) so as to be spaced apart from one another, and the engaging portion (130, 135) of the disc spring portion (120) includes the plural engaging portions (130, 135) each engaging with each of the plural engaged portions (220, 225) along the outer circumference.

According to the aforementioned configuration, the disc spring portion 120 is connected to the plate 200, 200A, 200B via the engaging portion 130, 135 to inhibit the frictional force due to the sliding with the plate 200, 200A, 200B when the torque connection/disconnection function is operated from generating. Accordingly, the torque limiter 90 inhibiting the change of the release torque may be provided.

According to the aforementioned first, second and third embodiments, the torque limiter 90 further includes the support portion (140) that is formed in a cylindrical shape, that is integrally formed with the disc spring portion (120), and that is connected to the output shaft (20).

According to the aforementioned configuration, because the disc spring portion 120 and the support portion 140 are integrally molded, the frictional force due to the sliding between the disc spring portion 120 and the support portion 140 when the torque connection/disconnection function is operated is not practically generated. Accordingly, the torque limiter 90 inhibiting the variation of the release torque may be provided.

According to the aforementioned first, second and third embodiments, the support portion (140) is restricted from moving along the axial direction by being fixed to the input shaft (50).

According to the aforementioned configuration, because the support portion 140 is inhibited from moving along the axial direction relative to the input shaft 50, the frictional force due to the sliding between support portion 140 together with the disc spring portion 120 being integrally molded therewith and other members (for example, the input shaft 50) is not practically generated. Accordingly, the torque limiter 90 inhibiting the variation of the release torque may be provided.

According to the aforementioned first, second and third embodiments, the first meshing portion (52) includes the plural first protrusions (520) being arranged so as to be spaced apart from one another and extending radially, and the second meshing portion (210, 210A, 210B) includes the plural second protrusions (240, 270, 300) being arranged so as to be spaced apart from one another and extending radially.

According to the aforementioned configuration, the first meshing portion 52 including the plural first protrusions 520 extending radially is securely meshed with the second meshing portion 210, 210A, 210B including the plural second protrusions 240, 270, 300 extending radially. Accordingly, the torque limiter 90 establishing the torque connection/disconnection function may be provided.

According to the aforementioned first, second and third embodiments, each of the plural second protrusions (240, 270, 300) is provided at the reference surface (230) of the plate (200, 200A, 200B), and includes the main surface (246, 276, 306) extending in the radial direction of the plate (200, 200A, 200B) from the first end (242, 272, 302) to the second end (244, 274, 304) towards the outer circumferential rim of the plate (200, 200A, 200B) in a parallel manner relative to the reference surface (230), the first inclination surface (248, 278, 308) extending in the radial direction by connecting between the main surface (246, 276, 306) and the reference surface (230), and the second inclination surface (250, 280, 310) extending in the radial direction by connecting between the main surface (246, 276, 306) and the reference surface (230) while sandwiching the main surface (246, 276, 306) with the first inclination surface (248, 278, 308).

According to the aforementioned configuration, the second protrusion 240, 270, 300 constituting the second meshing portion 210, 210A, 210B meshes with the first protrusion 520 constituting the first meshing portion 52 via the first inclination surface 248, 278, 308 and the second inclination surface 250, 280, 310. In a case where the predetermined torque is inputted, the second meshing portion 210, 210A, 210B (the first meshing portion 52) is pressed in the direction opposite to the first meshing portion 52 (the second meshing portion 210, 210A, 210B). Accordingly, the torque limiter 90 establishing the torque connection/disconnection function may be provided.

According to the second and third embodiments, each of the plural second protrusions (270, 300) includes the third inclination surface (282, 312) extending in the radial direction towards the outer circumferential rim from the second end (274, 304) of the main surface (276, 306); and the third inclination surface (282, 312) forms the angle ($\beta_3$) relative to the reference surface (230), the angle ($\beta_3$) that is smaller than the angle ($\alpha_1, \alpha_2$) formed by each of the first inclination surface (278, 308) and the second inclination surface (280, 310) relative to the reference surface (230).

According to the aforementioned embodiment, the second protrusion 270, 300 constituting the second meshing portion 210A, 210B includes a third inclination surface 282, 312 extending in a radial direction towards the outer circumferential rim of the disc spring portion 120 to inhibit the torque from generating partially relative to an area of the outer diameter of the second protrusion 270, 300 of the second meshing portion 210A, 210B.

According to the aforementioned second and third embodiments, each of the plural second protrusions (270, 300) includes the first inclination surface (278, 308) and the second inclination surface (280) each forming the angle ($\alpha_A, \alpha_{A1}$) relative to the reference surface (230), the angle ($\alpha_A, \alpha_{A1}$) decreasing towards the outer circumferential rim along the radial direction.

According to the aforementioned embodiment, the second protrusion 270, 300 constituting the second face cam 210A, 210B includes the first inclination surface 278, 308 and the second inclination surface 280, 310 including the inclination angles $\alpha_A, \alpha_{A1}$ that each decreases continuously towards the outer diameter from the inner diameter. Accordingly, the stress force is inhibited from concentrating at the specific part of the second protrusion 270, 300 in the radial direction.

According to the aforementioned first, second and third embodiments, the disc spring portion (120) extends from the first end (122) to the second end (124), includes the curved portion (123) having a cross section of a semicircular shape at the first end (122), and includes the through hole (125).

According to the configuration, in a case where the predetermined torque is inputted, the engaging portion 130, 135 of the disc spring portion 120 engaging with the plate 200, 200A, 200B bends so that the engaging portion 130, 135 is displaced in the direction opposite to the first meshing portion (the first face cam 52) provided at the input shaft (the counter driven gear 50) to move the second meshing portion (the second face cam 210, 210A, 210B) provided at the plate 200, 200A, 200B in the direction opposite to the first meshing portion (the first face cam 52). Accordingly, the meshing of the first meshing portion (52) and the second meshing portion (210, 210A, 210B) may be released, and the transmission of the torque may be disconnected between the input shaft (50) and the output shaft (for example, the counter shaft 20). Accordingly, the torque limiter 90 available of torque connection/disconnection function may be provided.

According to the aforementioned first, second and third embodiments, the support portion (140) includes the plural groove portions (148) at an inner circumferential surface, the groove portions (148) being arranged so as to be spaced apart from one another and extending along the axial direction.

According to the aforementioned configuration, because the disc spring portion 120 and the support portion 140 are integrally molded, the frictional force due to the sliding between the disc spring portion 120 and the support portion 140 when the torque connection/disconnection function is operated is not practically generated. Accordingly, the torque limiter 90 inhibiting the variation of the release torque may be provided.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:
1. A torque limiter, comprising:
a first meshing portion being provided at a surface of an input shaft which transmits a drive force of a drive motor, the surface intersecting with an axial direction of the input shaft;
a plate being formed in an annular shape, being provided coaxially with the input shaft, and including a second meshing portion which faces the first meshing portion in the axial direction and which is configured to mesh with the first meshing portion;
a disc spring portion being integrally rotatable with an output shaft which is provided coaxially with the input shaft and which is rotatable relative to the input shaft, the disc spring portion including an engaging portion engaging with the plate, the disc spring portion being deflected to displace the engaging portion in a direction opposite to the plate in a case where a load equal to or greater than a set value is applied to the disc spring portion while pressing the plate via the engaging portion so as to bias the second meshing portion towards the first meshing portion; and
a support portion that is formed in a cylindrical shape, that is integrally formed with the disc spring portion, and that is connected to the output shaft,
wherein the support portion is restricted from moving along the axial direction by being fixed to the input shaft.

2. The torque limiter according to claim 1, wherein
the plate includes a plurality of engaged portions that are arranged along an outer circumference of the plate so as to be spaced apart from one another, and
the engaging portion of the disc spring portion includes the plurality of engaging portions each engaging with each of the plurality of engaged portions along the outer circumference.

3. The torque limiter according to claim 1, wherein
the first meshing portion includes a plurality of first protrusions being arranged so as to be spaced apart from one another and extending radially, and
the second meshing portion includes a plurality of second protrusions being arranged so as to be spaced apart from one another and extending radially.

4. The torque limiter according to claim 3, wherein each of the plurality of second protrusions is provided at a reference surface of the plate, and includes a main surface extending in a radial direction of the plate from a first end to a second end towards an outer circumferential rim of the plate in a parallel manner relative to the reference surface, a first inclination surface extending in the radial direction by connecting between the main surface and the reference surface, and a second inclination surface extending in the radial direction by connecting between the main surface and the reference surface while sandwiching the main surface with the first inclination surface.

5. The torque limiter according to claim 4, wherein
each of the plurality of second protrusions includes a third inclination surface extending in the radial direction towards the outer circumferential rim from the second end of the main surface, and
the third inclination surface forms an angle relative to the reference surface, the angle that is smaller than an angle formed by each of the first inclination surface and the second inclination surface relative to the reference surface.

6. The torque limiter according to claim 5, wherein each of the plurality of second protrusions includes the first inclination surface and the second inclination surface each forming an angle relative to the reference surface, the angle decreasing towards the outer circumferential rim along the radial direction.

7. The torque limiter according to claim 1, wherein the disc spring portion extends from a first end to a second end, includes a curved portion having a cross section of a semicircular shape at the first end, and includes a through hole.

8. The torque limiter according to claim 1, wherein the support portion includes a plurality of groove portions at an inner circumferential surface, the groove portions being arranged so as to be spaced apart from one another and extending along the axial direction.

* * * * *